US008969636B2

(12) United States Patent
Wright et al.

(10) Patent No.: US 8,969,636 B2
(45) Date of Patent: *Mar. 3, 2015

(54) HOMOGENEOUS METALLOCENE ZIEGLER-NATTA CATALYSTS FOR THE OLIGOMERIZATION OF OLEFINS IN ALIPHATIC-HYDROCARBON SOLVENTS

(75) Inventors: Michael E. Wright, Ridgecrest, CA (US); Benjamin G. Harvey, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/426,118

(22) Filed: Mar. 21, 2012

(65) Prior Publication Data

US 2013/0253236 A1 Sep. 26, 2013

Related U.S. Application Data

(63) Continuation-in-part of application No. 12/511,796, filed on Jul. 29, 2009, now Pat. No. 8,395,007, which is a continuation-in-part of application No. 12/550,973, filed on Aug. 31, 2009, now Pat. No. 8,227,651.

(60) Provisional application No. 61/585,943, filed on Jan. 12, 2012.

(51) Int. Cl.
  *C10L 1/04* (2006.01)
  *C07C 2/08* (2006.01)

(52) U.S. Cl.
  USPC ............. 585/14; 585/510; 585/512; 585/520; 585/523

(58) Field of Classification Search
  CPC .................. C10L 2200/043; C10L 2200/0438; C10L 2200/0446; C10L 2270/026; C10L 2270/04
  USPC ............................ 585/14, 510–516, 520–533
  See application file for complete search history.

(56) References Cited

U.S. PATENT DOCUMENTS

| | | | |
|---|---|---|---|
| 4,234,752 A | 11/1980 | Wu et al. | |
| 4,260,845 A | 4/1981 | Shioyama | |
| 4,473,444 A | 9/1984 | Feldman et al. | |
| 4,772,736 A | 9/1988 | Edwards et al. | |
| 5,158,992 A | 10/1992 | Caselli et al. | |
| 5,625,106 A * | 4/1997 | Marks et al. | 585/512 |
| 5,830,821 A | 11/1998 | Rohrmann et al. | |
| 5,922,631 A * | 7/1999 | Sangokoya | 502/121 |
| 6,214,953 B1 | 4/2001 | Oh et al. | |
| 6,306,983 B1 * | 10/2001 | Sikorski, Jr. | 526/89 |
| 6,929,705 B2 | 8/2005 | Myers et al. | |
| 7,902,415 B2 * | 3/2011 | Small | 585/513 |
| 8,071,835 B2 * | 12/2011 | Wu et al. | 585/823 |
| 8,207,390 B2 * | 6/2012 | Wu et al. | 585/523 |
| 8,227,653 B2 * | 7/2012 | Weber et al. | 585/527 |
| 8,242,319 B1 | 8/2012 | Wright et al. | |
| 8,344,196 B2 | 1/2013 | Wright et al. | |
| 8,350,107 B2 | 1/2013 | Wright et al. | |
| 8,395,007 B2 | 3/2013 | Wright et al. | |
| 8,470,165 B2 * | 6/2013 | Cosyns et al. | 208/66 |
| 8,513,478 B2 * | 8/2013 | Wu et al. | 585/523 |
| 8,633,287 B2 * | 1/2014 | Citron | 526/113 |
| 2001/0006154 A1 | 7/2001 | Krug et al. | |
| 2002/0177728 A1 | 11/2002 | Boudreaux et al. | |
| 2003/0125595 A1 | 7/2003 | Bagheri et al. | |
| 2005/0267271 A1 | 12/2005 | Mink et al. | |
| 2007/0185362 A1 | 8/2007 | Lattner et al. | |
| 2007/0293640 A1 | 12/2007 | Jiang et al. | |
| 2007/0293712 A1 | 12/2007 | Tiitta et al. | |
| 2008/0102502 A1 | 5/2008 | Foody et al. | |
| 2008/0132730 A1 | 6/2008 | Manzer et al. | |
| 2008/0216391 A1 | 9/2008 | Cortright et al. | |
| 2009/0124835 A1 | 5/2009 | Yamaguchi et al. | |
| 2009/0139134 A1 | 6/2009 | Yoshikuni et al. | |
| 2009/0299109 A1 | 12/2009 | Gruber et al. | |
| 2009/0305926 A1 | 12/2009 | Wu et al. | |
| 2010/0069589 A1 | 3/2010 | Bradin | |
| 2010/0155333 A1 | 6/2010 | Husain et al. | |
| 2010/0204925 A1 | 8/2010 | Albahri | |
| 2010/0330633 A1 | 12/2010 | Walther et al. | |
| 2011/0061290 A1 | 3/2011 | Aulich et al. | |
| 2011/0111475 A1 | 5/2011 | Kuhry et al. | |
| 2011/0114538 A1 | 5/2011 | Cosyns et al. | |
| 2011/0160502 A1 | 6/2011 | Wu et al. | |
| 2011/0172475 A1 | 7/2011 | Peters et al. | |
| 2012/0207648 A1 | 8/2012 | Wright et al. | |
| 2012/0209036 A1 * | 8/2012 | Harvey et al. | 585/14 |
| 2012/0209039 A1 | 8/2012 | Wright et al. | |
| 2012/0209040 A1 | 8/2012 | Wright et al. | |
| 2012/0209047 A1 | 8/2012 | Wright et al. | |

(Continued)

FOREIGN PATENT DOCUMENTS

EP 0173471 B1 6/1989
WO WO 2010/055935 A1 5/2010

(Continued)

OTHER PUBLICATIONS

Williams, et al., "Kineticstudies of catalyticdehydration of tert-butanol on zeolite NaH-ZSM-5"; Journal of Catalysis [online], Jan. 1991, vol. 127, Iss. 1, pp. 377-392.

(Continued)

*Primary Examiner* — Ellen McAvoy
(74) *Attorney, Agent, or Firm* — Charlene A. Haley

(57) ABSTRACT

An approach that permits continuous batch conversion of alpha-olefins and internal-olefins to oligomeric materials without fouling the reaction vessel and provides a simple and highly efficient method for making very cost effective catalyst systems based on Zeigler-Natta Group 4 metallocenes. Embodiments of this invention produce diesel and turbine fuels that are 100% synthetic iso-paraffinic kerosenes with flashpoints greater than 61 deg C.

12 Claims, 1 Drawing Sheet

(56) References Cited

U.S. PATENT DOCUMENTS

| | | |
|---|---|---|
| 2012/0238788 A1 | 9/2012 | Wright et al. |
| 2013/0032550 A1 | 2/2013 | Wright et al. |
| 2013/0197279 A1 | 8/2013 | Wright et al. |
| 2013/0253236 A1 | 9/2013 | Wright et al. |

FOREIGN PATENT DOCUMENTS

| | | |
|---|---|---|
| WO | WO 2010/136289 A2 | 12/2010 |
| WO | PCT/US12/35121 | 4/2012 |
| WO | PCT/US12/35126 | 4/2012 |
| WO | PCT/US12/35132 | 4/2012 |
| WO | PCT/US12/35146 | 4/2012 |
| WO | PCT/US12/35167 | 4/2012 |
| WO | PCT/US12/41200 | 6/2012 |
| WO | PCT/US2012/035126 | 3/2013 |
| WO | PCT/US2012/035132 | 5/2013 |
| WO | PCT/US2012/041200 | 5/2013 |
| WO | PCT/US2012/035167 | 7/2013 |
| WO | PCT/US2012/035146 | 9/2013 |
| WO | PCT/US2012/035155 | 10/2013 |
| WO | PCT/US2012/035184 | 10/2013 |
| WO | PCT/US2012/035190 | 10/2013 |
| WO | PCT/US2012/035121 | 11/2013 |
| WO | PCT/US2012/035167 | 7/2014 |

OTHER PUBLICATIONS

Leeuwen, et al., "New processes for the selective production of 1-octene"; Coordination Chemistry Reviews [online], Epub, Oct. 16, 2010, vol. 255, Iss. 13-14; pp. 1499-1517.

* cited by examiner

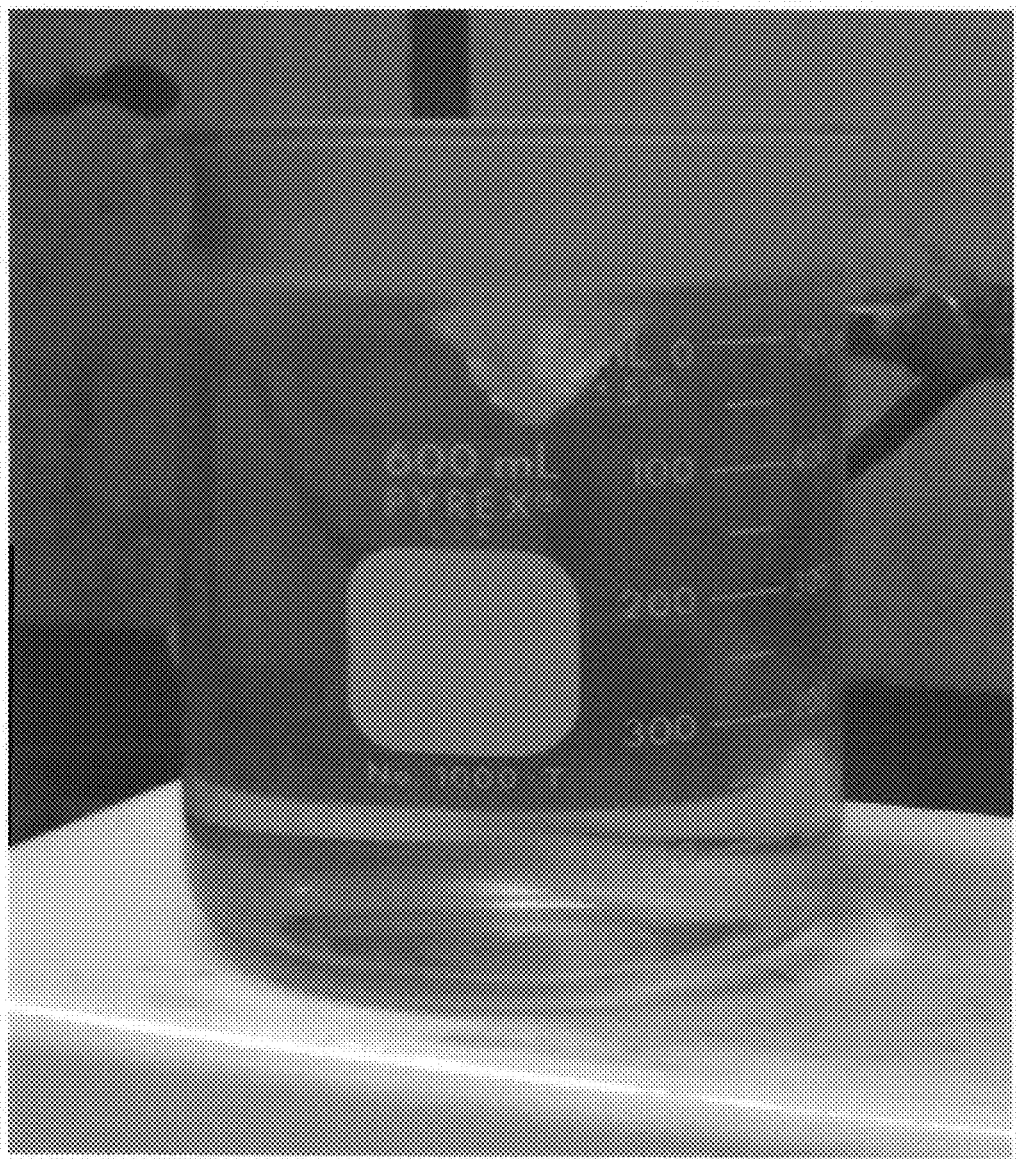

HOMOGENEOUS METALLOCENE ZIEGLER-NATTA CATALYSTS FOR THE OLIGOMERIZATION OF OLEFINS IN ALIPHATIC-HYDROCARBON SOLVENTS

CROSS-REFERENCE TO RELATED APPLICATIONS

This is a continuation-in-part application, claiming the benefit of, parent application Ser. No. 12/511,796 filed on Jul. 29, 2009, which is now U.S. Pat. No. 8,395,007 and parent application Ser. No. 12/550,973 filed on Aug. 31, 2009, which is now U.S. Pat. No. 8,227,651, and parent provisional application Ser. No. 61/585,943 filed Jan. 12, 2012, whereby the entire disclosures of which are incorporated hereby reference.

STATEMENT FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to an approach that permits continuous batch conversion of alpha-olefins and internal olefins to oligomeric materials without fouling the reaction vessel and provides a simple and highly efficient method for making very cost effective catalyst systems based on Group 4 metallocenes. Embodiments of the invention create synthetic iso-paraffinic kersosenes with high flashpoints suitable for use gas, diesel, and turbine engines.

BRIEF DESCRIPTION OF THE DRAWINGS

FIG. 1 is a photograph of a beaker removed directly from SS-bomb showing a typical homogeneous oligomeric mixture from 1-butene that contains the $Cp_2ZrCl_2$/MAO catalyst system prepared in cyclohexane, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to an approach that permits continuous batch conversion of alpha-olefin and internal-olefins to oligomeric materials without fouling the reaction vessel and provides a simple and highly efficient method for making very cost effective catalyst systems based on Group 4 metallocenes.

Most homogeneous ZN catalyst are prepared in aromatic solvents.

This invention provides a versatile and inexpensive means for creating and using highly active catalysts for the oligomerization of alpha-olefins, like 1-butene. Hence, very valuable for turning 1-butene (made from bio-1-butanol) to oligomers suitable for use in creating diesel and jet fuels with flashpoints over 61 deg C. Furthermore, by addition of a homogeneous isomerization catalyst mixtures of alpha-olefins and internal-olefins can be converted to high flashpoint diesel and jet fuels using highly active homogeneous ZN invented herein.

An aspect of the invention includes a fuel(s) produced from oligomerization and/or dimerization processes including; at least one alpha-olefin and/or internal olefins, at least one homogenous Ziegler-Natta catalyst, at least one homogenous activating co-catalyst, and at least one or mixture hydrocarbon solvent, where the fuel has a flashpoint of 61 to 100° C. Embodiments of the invention further include at least one olefin-isomerization catalyst. Other embodiments of the invention include a Ziegler-Natta catalyst having group four (4) metallocene catalyst. In other embodiments, the co-catalyst is an alkylaluminoxane (AAO). Yet in other embodiments, the catalyst is prepared by contacting a metallocene precatalyst with an aliphatic hydrocarbon solution having an alkylaluminoxane (AAO). In still yet other embodiments, the aliphatic hydrocarbon solution is derived from a fuel.

Embodiments of the invention include the catalyst being prepared by dissolving trialkylalane in an aliphatic-hydrocarbon solvent and/or fuel and treated with one mol-equivalent of water and are then contacted with a metallocene precatalyst and filtered. In embodiments, the trialkylalanes are selected from the group consisting of trimethylalane, triethylalane, tributylalane, and tri(iso-butyl)alane (TIBA). In other embodiments, the aliphatic hydrocarbon solvents and/or fuels are selected from the group consisting of straight chain alkanes including hexanes, heptanes, octanes, nonanes, decanes, and alkanes having greater than 10 carbons. In yet other embodiments, the aliphatic hydrocarbon solvents and/or fuels are selected from the group consisting of, but not limited to, branched-aliphatic-hydrocarbons including 3-methylheptane, 2-methyloctane, and 6 to 16 carbons. Still yet in other embodiments, the aliphatic hydrocarbon solvents and/or fuels are selected from the group consisting of, but not limited to, cyclic aliphatic-hydrocarbons including cyclohexanes, methylcyclohexanes, dimethylcyclohexanes, tetralins, pinanes, and other mono- and bicyclic aliphatic-hydrocarbons.

Another aspect of the invention includes a process for preparing a saturated hydrocarbon solution/fuel including; an Activated Homogeneous Metallocene Catalyst (AHMC) for use in the dimerization and oligomerization of neat α-olefins, where AHMC is prepared by contacting a metallocene precatalyst of the formula (I) with an alkylaluminoxane of formula (II), where the latter is prepared in a saturated hydrocarbon solution/fuel:

$$L^1L^2MX^1X^2 \tag{I}$$

(II)

where: M is Ti, Zr, or Hf, $X^1$ and $X^2$ is at least one halogen, hydrogen, alkyl, or a mixture thereof, $L^1$ and $L^2$ are comprised of π-ligands selected from the group consisting of cyclopentadienyl, indenyl, fluorenyl and derivatives thereof, where substituents are attached to the ligands, the attachments includes ansa-linkages that bind the two rings, with at least one carbon or silicon atoms each bearing hydrogen or alkyl radicals, at least one saturated hydrocarbon solvent/fuel selected from the group consisting of cycloalkanes, normal-alkanes, and/or iso-alkanes, n is an integer of at least 3, and R is a $C_1$-$C_{30}$ alkyl, linear, branched, or combination thereof.

Embodiments of the invention include the Al/M molar ratio being about 1 to 100. In other embodiments, the Al/M molar ratio is 10 to 20. Embodiments of the invention include the AHMC being prepared by placing in contact with a neat solution having at least one α-olefin during a period of 1 to 24 h and forms the α-olefinic-oligomer (III) in 98-100% conversion based on starting α-olefins:

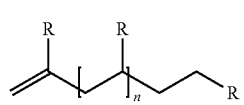

(III)

Embodiments of the invention include the AHMC being introduced in one portion, in discrete aliquots, or through a continual addition process directly to the neat α-olefins. Embodiments of the invention include the ratio of metallocene precatalyst (g of M) to α-olefinic-oligomer product (Kg) is about 5 to 40. In other embodiments, the entire α-olefmic-oligomer product (III) is transferred to quench vessel, treated with water, and then filtered to remove solids. In other embodiments, the α-olefinic-oligomer product (III) is passed through an alumina or other metal oxide filter material to remove M and Al species from the product solution. Other embodiments, the α-olefmic-oligomer product (III) is treated with a stabilizing agent selected from either a hydroquinone or phenol family of stabilizers, with butylated hydroxyl toluene (BHT) and at concentrations of 10-300 ppm.

Embodiments of the invention include the process lowering the boiling fraction of the α-olefinic-oligomer products (III) between 50° C. and 150° C., including between 70° C. and 130° C., and are removed by flash distillation. Embodiments of the invention include the process having a low boiling fraction from about 25 to 45 wt-% of the total α-olefinic-oligomer product, or comprises about 30-40 wt-% of the total a-olefinic-oligomer. In embodiments, the process includes a light boiling fraction subjected to selective-dimerization chemistries to create a mixture of mono-olefmic hydrocarbon products having a boiling point greater than 200° C. but less than 300° C. at atmospheric pressure. Embodiments of the invention include the process having a high boiling fraction subjected to catalytic hydrogenation over heterogeneous metal catalysts having palladium, platinum, and/or nickel (or any combination thereof). Embodiments of the invention include the process having a hydrogen pressure in the range of about 30-3000 psig, or a pressure between 50 and 100 psig. Embodiments of the invention the reaction temperature used is in the range of about 20 to 100° C. with ambient or 40° C. temperature range.

Embodiments of the invention further include the product being subjected to hydrogenation over heterogeneous metal catalysts which includes palladium, platinum, and/or nickel; hydrogen pressure is performed in the range of about 30-3000 psig, or a pressure between 1000 and 2000 psig. In embodiments, the temperature is in the range of 20 to 100° C. or 60° C. to 80° C. temperature range. In embodiments, the products are combined and distilled at atmospheric pressure. In other embodiments, the products obtained are combined and distilled at reduced pressure. Embodiments of the invention a collection of hydrocarbon, a completely 100% synthetic iso-paraffinic kerosene (SiPK) product, starting at 150° C. and finishing at 280° C. affords a fuel mixture that meets Jet-A/JP-8 and diesel #1 flashpoint requirements (≥38° C.). Embodiments of the invention the SiPK jet/diesel fuel produced has a derived Cetane index of 40-55 or 50 Cetane index. In other embodiments, the SiPK jet/diesl fuel produced has a maximum cold flow viscosity of 8 cSt as measured at −20° C. (ASTM 445LT).

Embodiments of the invention include the collection of product starting at 170° C. and finishing at 280° C. yields a SiPK jet/diesel that meets military JP-5 and diesel #2 flashpoint requirements with a flashpoint >61° C. Embodiments of the invention include the SiPK jet/diesel fuel produced has a derived Cetane index of 40-55 or 50 Cetane index. Embodiments of the invention include SiPK jet/diesl fuel produced has a maximum cold flow viscosity of 8.5 cSt as measured at −20° C. (ASTM 445LT). Embodiments of the invention include the α-olefins are selected from the group consisting of, but not limited to, 1-propene, 1-butene, 1-pentene, and 1-hexene, with neat 1-butene or a mixture of 1-butene and 1-propene (3:1, mol:mol, respectively).

Embodiments of the invention includes the π-ligands being cyclopentadienyl, R is methyl, and the aliphatic hydrocarbon solution/fuel is cyclohexane or methylcyclohexane. Embodiments of the inventions include the π-ligands are cyclopentadienyl rings having at least one alkyl group attached, R is methyl, and the aliphatic hydrocarbon solution/fuel is selected from the group consisting of cyclic, acyclic linear and branched hydrocarbon solvent that include jet and diesel fuels prepared. Embodiments of the invention include the π-ligands being cyclopentadienyl, R is at least three carbons, and the aliphatic hydrocarbon solution/fuel is selected from acyclic linear and/or branched hydrocarbon solution/fuel.

Embodiments of the invention include the trialkylalane compound being prepared by direct reaction of one mol of trialkylalane with on mol-equivalent of water in the SiPK. Other embodiments of the invention include the trialkylalane is selected from the group consisting of, but not limited to, trimethyl, triethylalane, tripropylalane, tri-isopropylalane, tributylalane, and tri-isobutylalane, and tri-isobutylalane. In other embodiments, the trialkylalane compound is prepared by direct reaction of one mol of trialkylalane with on mol-equivalent of water in the SiPK. Yet in other embodiments, the trialkylalane is selected from the group consisting of, but not limited to, trimethyl, triethylalane, tripropylalane, tri-isopropylalane, tributylalane, and tri-isobutylalane, and triisobutylalane. Still yet in other embodiments the π-ligands are cyclopentadienyl rings having at least two alkyl groups attached, R is methyl, and the aliphatic hydrocarbon solution/fuel is selected from the group consisting of cyclic, acyclic linear, branched hydrocarbon solvent, and jet and diesel fuels prepared. Embodiments of the invention include a fuel having a flashpoint of about 61 to about 100. Embodiments of the invention further include an isomerization catalyst having a range from about 0.1 ppm to about 0.1 weight %, relative to the total olefin component.

Oligomers, suitable for conversion and use as jet and diesel fuels, are prepared from alpha-olefins using highly active purely homogeneous Ziegler-Natta catalysts, a homogeneous co-catalyst, and in pure aliphatic hydrocarbon solvent. The oligomerization can be conducted controlled without the use of hydrogen and produce an ideal molecular distribution of oligomers for use in preparing diesel and jet fuels. This method creates fuels that do not require any subsequent hydrocracking or reforming yet retain outstanding cold flow properties and exceptionally high gravimetric densities.

The homogeneous catalyst of embodiments of the invention is prepared by contacting a metallocene precatalyst with a solution of an alkylaluminoxane (AAO). Typically, $R^1$ and $R^2$ can be hydrogen or any combination of $C_1$-$C_{30}$ alkyl chains. The $R^1$ and $R^2$ substituents(s) are linear or branched chains and or a combination thereof. The alkylaluminoxane can be prepared using methods that familiar to people skilled in the art and $R^3$ is a $C_1$-$C_{30}$ alkyl group, although larger chains can be employed. Branching in the alkyl group can be used to increase solubility although is not required in this invention. When the AAO is prepared in an aromatic solvent, the metallocene precatalyst is combined and the aromatic solvent is removed under reduced pressure and the solids redissolved in the desired aliphatic-hydrocarbon solvent or fuel, filtered if necessary, and then transferred to the reaction vessel that contains the mixture of alpha-olefin and internal-olefins. These activated homogeneous catalyst solutions are stable and suitable for storage. Typical alpha-olefins would include $R^4$ being a $C_1$-$C_{10}$ alkyl group that can be a linear chain or contain branching at various places in the carbon chain. The internal olefin is any olefin-isomer where the double-bond has chemically migrated internally along the carbon chain. The homogeneous isomerization catalyst takes the internal-olefin and isomerizes the bond so as to create the corresponding alpha-olefin.

which are all commercially available. Alanes containing longer alkyl chains can be prepared by existing methods familiar to those in the art by simple reaction of an alkyl Grignard with aluminum trichloride. For the methylaluminoxane, toluene solutions can be utilized from commercial sources to prepare the active metallocene catalyst followed by removal and recycling of the toluene. Then the active metallocene/MAO catalyst can be dissolved in the desired aliphatic-hydrocarbon solvent. Use of MAO in this invention it is found preferable to utilize a metallocene precatalyst that has alkyl substitution on one or more of the cyclopentadienyl rings, although this is not required if certain aliphatic hydrocarbon solvents are used. In general, alkyl-substitution of the metallocene rings provides enhanced solubility over a range of aliphatic-hydrocarbons and can be used to increase the activated metallocene catalyst concentration when desired.

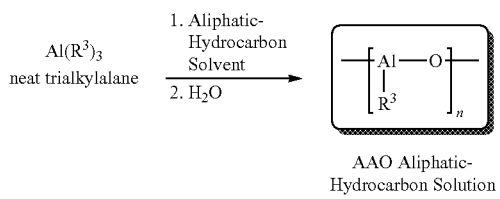

AAO Aliphatic-Hydrocarbon Solution

[Reaction scheme showing Pre-Catalyst converting to Activated Homogeneous Metallocene Oligomerization Catalyst via Aliphatic-Hydrocarbon Solvent and AAO, then to Oligomeric Mixture used in Diesel and Jet Fuel Production via filter and addition of alpha-olefin(s), with $Al(R_3)^3$ and $H_2O$.]

Another embodiment of the chemical process for preparing the homogeneous metallocene catalyst in pure aliphatic-hydrocarbon solvent follows:

A trialkylalane is dissolved in an aliphatic-hydrocarbon solvent and treated with one mol-equivalent of water, this solution is then placed in contact with a metallocene precatalyst. The molar ratio of alane/metallocene can be varied from 1:1 to 100:1, respectively, depending on the desired catalytic process and outcome. The final solutions may be filtered to remove any impurities or undesired products resulting from the controlled hydrolysis of the alane and subsequent reaction with the metallocene pre-catalyst. The final solutions are typically light yellow in color and crystal clear to the eye. Typical concentrations of the active homogeneous catalysts are in the range of 0.1M to 0.01M, with lower concentrations possible with equal catalytic activity. These latter solutions can be stored for long periods or immediately transferred to reaction vessels using common techniques that include Teflon® diaphragm pumps or by simple polypropylene syringes, all with equal success and retention of catalyst activity.

Typical trialkylalanes can be trimethylalane, triethylalane, tripropylalane, tributylalane, and tri(isobutyl)alane (TIBA), -continued For example:

[Structure of TIBA: Al with three isobutyl groups] TIBA

Typical aliphatic-hydrocarbon solvents useful in this invention include straight chain alkanes such as hexane, heptanes, octane, nonane, and decane. Branched-aliphatic-hydrocarbons such as 3-methylheptane, 2-methylheptane, and 2-methyloctane work well in this invention as well as other branched aliphatic hydrocarbons containing from 6 to 16 carbons. In particular, the use of C12 to C16 staturated synthetic iso-paraffinic kerosenes are for use in this embodiment. Cyclic aliphatic-hydrocarbons can be used that include cyclohexane, methylcyclohexane, dimethylcyclohexanes, tetralin, pinane, and other mono- and bicyclic aliphatic-hydrocarbons.

Useful metallocene pre-catalysts for this invention can be prepared by several methods, some found in the open literature covering nearly four decades of group metallocene synthetic procedures [Y. Qian et al., *Chem. Rev.*, 103(7), pp 2633-2690 (2003); R. Halterman, *Chem. Rev.*, 92(5), pp 965-994 (1992)]. In addition, two patents describe the synthesis of simple bis(n-alkylcyclopentadienyl)MCl$_2$ (where M=Group 4 transition metal) [J.-S. Oh et al. U.S. Pat. No. 6,214,953 B1 (2001) and J. M. Sullivan et al. U.S. Pat. No. 6,175,027 B1 (2001)]. Oh and co-workers describe the use of alkyl-metallocenes for preparing supported ZN-catalysts and Sullivan and coworkers do not report any catalytic chemistry or solubility properties for the metallocene compounds prepared. Thus, unsubstituted and all alkyl and multiple-alkyl substituted metallocenes, ansa-metallocenes, indenyl, fluorocenyl, and related metallocenes can be used in the present invention when combined with the appropriate aliphatic-hydrocarbon solvent and AAO, all affording highly active and selective oligomerization ZN-catalysts.

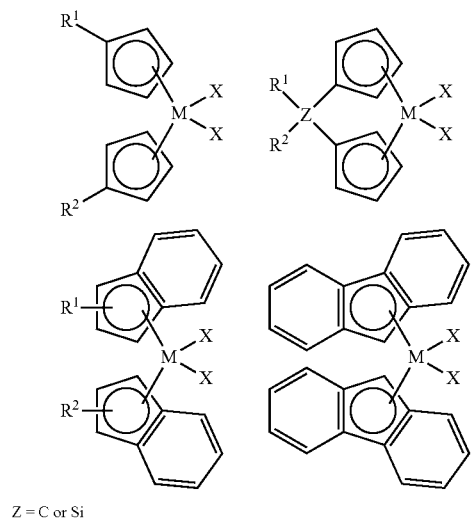

Z = C or Si

Olefinic monomers that can used in the current invention include ethene, α-olefins, mono- and bicyclic olefins, dienes, vinyl-aromatics and the like. The preferred are ethene, 1-propene, 1-butene, 1-pentene, 1-hexene, 1-heptene, 1-octene, cyclopentene, cyclopentadiene, norbornene, styrene, and the like. The monomer can be copolymerized with one or more other monomers. Internal-olefins including 2-hexene, 2-pentene, 2-butene can be used in the invention by introduction of a homogeneous group 8 transition metal complex/isomerization catalyst, with nickel the being another embodiment of a transition metal.

EXAMPLE 1

Preparation of the Homogeneous Zn-Catalyst in an Aliphatic-Hydrocarbon Solvent.

A Schlenk flask is charged with Cp$_2$ZrCl$_2$ (0.080 g, 0.274 mmol) and 10 mL of a toluene MAO solution (8.0 wt-% active MAO). The toluene was removed under reduced pressure to afford a yellow solid. To this mixture was added cyclohexane (15 mL) and heated briefly with stirring to dissolve the activated catalyst. The solution was allowed to settle and clear yellow solution was collected by syringe (~10 mL) and used directly or stored for future use.

EXAMPLE 2

Oligomerization of an Alpha-Olefin Using a Homogeneous ZN-Catalyst Delivered in an Aliphatic Hydrocarbon-Solvent.

1-Butene (~390 g, ~500 mL, CP grade) was condensed over calcium hydride inside a Schlenk flask maintained at −70° C. and re-evaporated and passed through a column of activated alumina in route to being condensed inside a dried 0.7 L capacity PARR SS bomb. A 500 mL beaker was placed inside the bomb to simulate a glass lined reaction vessel. Once the 1-butene was condensed inside the SS bomb the sample was subjected to five evacuation/backfill cycles to remove residual amounts of oxygen. The homogeneous aliphatic-hydrocarbon solution containing the active catalyst was added to the mixture and 3 addition evacuation/backfill cycles were performed. The SS bomb was sealed and allowed to react for 8 h. Shorter times could be used if the SS bomb was warmed by external heat. Typically after ~1 h the bomb reached a maximum pressure of 80 psig and approached 60° C. in temperature. At completion of the reaction little or no pressure remained in the vessel and the when removed from the SS bomb the beaker contained a clear light yellow solution of oligomers (see FIG. 1). Quenching the mixture with 0.5 mL of water and then drying over potassium carbonate (~3 g) afforded ~380 g of an oligomeric mixture suitable for use in making diesel and jet fuels with flash points over 61 deg C.

FIG. 1. Beaker removed directly from SS-bomb showing a typical homogeneous oligomeric mixture from 1-butene that contains the Cp$_2$ZrCl$_2$/MAO catalyst system prepared in cyclohexane. Sample contains no aromatic-hydrocarbons.

Prophetic Examples

The following prophetic examples are for illustration purposes only and not to be used to limit any of the embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A fuel produced from oligomerization and/or dimerization processes, comprising:
    providing at least one alpha-olefin and/or internal olefins;
    adding at least one homogenous Ziegler-Natta catalyst;
    adding at least one homogenous activating co-catalyst; and
    adding at least one or mixture hydrocarbon solvent,
        wherein said fuel having a flashpoint of 61 to 100° C.

2. The fuel according to claim 1, further comprising at least one olefin-isomerization catalyst.

3. The fuel according to claim 1, wherein said Ziegler-Natta catalyst includes group four (4) metallocene catalyst.

4. The fuel according to claim 1, wherein said co-catalyst is an alkylaluminoxane (AAO).

5. The fuels according to claim 1, wherein said catalyst is prepared by contacting a metallocene precatalyst with an aliphatic hydrocarbon solution having an alkylaluminoxane (AAO).

6. The fuel according to claim 5, wherein said aliphatic hydrocarbon solution is derived from a fuel.

7. The fuels according to claim 6, wherein said catalyst is prepared by dissolving trialkylalane in an aliphatic-hydrocarbon solvent and/or fuel and treated with one mol-equivalent of water and is then contacted with a metallocene precatalyst and filtered.

8. The fuels according to claim 7, wherein said trialkylalanes are selected from the group consisting of trimethylalane, triethylalane, tributylalane, and tri(iso-butyl)alane (TIBA).

9. The fuel according to claim 6, wherein said aliphatic hydrocarbon solvents and/or fuels are selected from the group consisting of straight chain alkanes including hexanes, heptanes, octanes, nonanes, decanes, and alkanes having greater than 10 carbons.

10. The fuel according to claim 6, wherein said aliphatic hydrocarbon solvents and/or fuels are selected from the group consisting of branched-aliphatic-hydrocarbons including 3-methylheptane, 2-methyloctane, and 6 to 16 carbons.

11. The fuels according to claim 6, wherein said aliphatic hydrocarbon solvents and/or fuels are selected from the group consisting of cyclic aliphatic-hydrocarbons including cyclohexanes, methylcyclohexanes, dimethylcyclohexanes, tetralins, pinanes, and other mono-and bicyclic aliphatic-hydrocarbons.

12. A fuel produced from oligomerization and/or dimerization processes, comprising:
   providing at least one alpha-olefin and/or internal olefins;
   adding at least one homogenous Ziegler-Natta catalyst; and
   adding at least one homogenous activating co-catalyst, wherein said fuel having a flashpoint 61 to 100° C.

* * * * *